US010631008B2

(12) United States Patent
Aflaki Beni

(10) Patent No.: US 10,631,008 B2
(45) Date of Patent: Apr. 21, 2020

(54) MULTI-CAMERA IMAGE CODING

(71) Applicant: Nokia Technologies Oy, Espoo (FI)

(72) Inventor: Payman Aflaki Beni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/087,729

(22) PCT Filed: Mar. 29, 2017

(86) PCT No.: PCT/IB2017/051800
§ 371 (c)(1),
(2) Date: Sep. 24, 2018

(87) PCT Pub. No.: WO2017/168347
PCT Pub. Date: Oct. 5, 2017

(65) Prior Publication Data
US 2019/0068993 A1    Feb. 28, 2019

(30) Foreign Application Priority Data

Mar. 31, 2016 (GB) .................................. 1605399.3

(51) Int. Cl.
*H04N 19/117*  (2014.01)
*H04N 13/243*  (2018.01)
(Continued)

(52) U.S. Cl.
CPC ......... *H04N 19/597* (2014.11); *H04N 13/139* (2018.05); *H04N 13/161* (2018.05);
(Continued)

(58) Field of Classification Search
CPC .......................... H04N 19/597; H04N 19/117
See application file for complete search history.

(56) References Cited

U.S. PATENT DOCUMENTS 6,678,323 B2    1/2004  Tam et al.
8,451,320 B1 *  5/2013  Cole .................... H04N 19/597
                                                       348/43
(Continued)

FOREIGN PATENT DOCUMENTS

WO    2012/039877 A1    3/2012
WO    2014/105654 A1    7/2014
(Continued)

OTHER PUBLICATIONS

McMillan, "An Image-Based Approach to Three-Dimensional Computer Graphics", Dissertation, 1997, 206 pages.
(Continued)

*Primary Examiner* — Irfan Habib
(74) *Attorney, Agent, or Firm* — Nokia Technologies Oy

(57) ABSTRACT

The invention relates to a method, where a first and second stereoscopic image are formed comprising a left eye image and a right eye image, a first central image region and a first peripheral image region are determined in the first stereoscopic image, the first central image region comprising a first central scene feature and the first peripheral image region comprising a first peripheral scene feature, and in the second stereoscopic image a second central image region and a second peripheral image region in said second stereoscopic image are determined, and based on said determining that said second central image region comprises said first peripheral scene feature, encoding said first stereoscopic image such that said first peripheral image region is encoded with a reduced quality with respect to said first central image region.

20 Claims, 11 Drawing Sheets

(51) Int. Cl.

| | | |
|---|---|---|
| *H04N 13/161* | (2018.01) | |
| *H04N 19/597* | (2014.01) | |
| *H04N 19/124* | (2014.01) | |
| *H04N 19/167* | (2014.01) | |
| *H04N 13/344* | (2018.01) | |
| *H04N 13/279* | (2018.01) | |
| *H04N 13/139* | (2018.01) | |
| *H04N 13/383* | (2018.01) | |
| *H04N 21/81* | (2011.01) | |

(52) U.S. Cl.
CPC ......... *H04N 13/243* (2018.05); *H04N 13/279* (2018.05); *H04N 13/344* (2018.05); *H04N 13/383* (2018.05); *H04N 19/117* (2014.11); *H04N 19/124* (2014.11); *H04N 19/167* (2014.11); *H04N 21/816* (2013.01)

(56) References Cited

U.S. PATENT DOCUMENTS

| | | | | |
|---|---|---|---|---|
| 9,691,358 | B2* | 6/2017 | Park | G06F 3/1423 |
| 10,313,663 | B2* | 6/2019 | Sassi | H04N 13/161 |
| 10,497,090 | B2* | 12/2019 | Tavakoli | H04N 19/51 |
| 2003/0198393 | A1 | 10/2003 | Berstis | |
| 2004/0246333 | A1 | 12/2004 | Steuart, III | |
| 2010/0111161 | A1 | 5/2010 | Ramachandran | |
| 2014/0341280 | A1 | 11/2014 | Yang et al. | |
| 2015/0109468 | A1 | 4/2015 | Laroia | |
| 2015/0116468 | A1* | 4/2015 | Au | G09G 3/003 348/54 |
| 2015/0173846 | A1* | 6/2015 | Schneider | A61B 1/00009 600/424 |
| 2015/0195506 | A1* | 7/2015 | Lin | H04N 19/597 375/240.16 |
| 2015/0287158 | A1* | 10/2015 | Cerny | G09G 5/14 345/553 |
| 2016/0086379 | A1* | 3/2016 | Sadi | G06F 3/167 345/633 |
| 2016/0088280 | A1 | 3/2016 | Sadi et al. | |

FOREIGN PATENT DOCUMENTS

| | | |
|---|---|---|
| WO | 2015/134400 A1 | 9/2015 |
| WO | 2015/155406 A1 | 10/2015 |
| WO | 2016/055688 A1 | 4/2016 |

OTHER PUBLICATIONS

Mark, "Post-Rendering 3D Image Warping: Visibility, Reconstruction, and Performance for Depth-Image Warping", Dissertation, Apr. 21, 1999, 227 pages.

"Methodology for the Subjective Assessment of the Quality of Television Pictures", Recommendation ITU-R BT.500-11, 2002, pp. 1-48.

Gorley et al., "Stereoscopic Image Quality Metrics and Compression", Stereoscopic Displays and Applications XIX, vol. 6803, Feb. 29, 2008, 12 pages.

Chikkerur et al., "Objective Video Quality Assessment Methods: A Classification, Review, and Performance Comparison", IEEE Transactions on Broadcasting, vol. 57, No. 2, Jun. 2011, pp. 165-182.

"User Requirements for Objective Perceptual Video Quality Measurements in Digital Cable Television", ITU-T Recommendation J.143, May 2000, 15 pages.

"Subjective Video Quality Assessment Methodsfor Multimedia Applications", ITU-T Recommendation P.910, Sep. 1999, 37 pages.

Cook et al., "Distributed Ray Tracing", Proceedings of the 11th annual conference on Computer graphics and interactive techniques, vol. 18, No. 3, Jul. 1984, pp. 137-145.

Gopinathan et al., "Design Considerations for High-Frequency Continuous-Time Filters and Implementation of an Antialiasing Filter for Digital Video", IEEE Journal of Solid-State Circuits, vol. 25, No. 6, Dec. 1990, pp. 1368-1378.

Azimi et al., "Subjective Study on Asymmetric Stereoscopic Video with Low-pass Filtered Slices", International Conference on Computing, Networking and Communications, Multimedia Computing and Communications Symposium, Jan. 30-Feb. 2, 2012, pp. 719-723.

Search Report received for corresponding United Kingdom Patent Application No. 1605399.3, dated Sep. 2, 2016, 3 pages.

International Search Report and Written Opinion received for corresponding Patent Cooperation Treaty Application No. PCT/IB2017/051800, dated Jul. 7, 2017, 12 pages.

Extended European Search Report received for corresponding European Patent Application No. 17773413.4, dated Oct. 21, 2019, 7 pages.

\* cited by examiner

MULTI-CAMERA IMAGE CODING

RELATED APPLICATION

This application was originally filed as Patent Cooperation Treaty Application No. PCT/IB2017/051800 filed Mar. 29, 2017 which claims priority benefit to GB Patent Application No. 1605399.3, filed Mar. 31, 2016.

BACKGROUND

With the emergence of new 3D video recording technology, where multiple cameras record a large field of view simultaneously, a 3D scene may be viewed, that is, an image of the scene with slightly different pictures for the left and right eye may be produced, from many different viewing angles. This is possible because video content may be transmitted for a plurality of cameras, and the cameras may have a suitable stereo disparity pair-wise, which makes it possible to select a pair of cameras for viewing with the left and the right eye and thus view a 3D image of the scene.

SUMMARY

Various embodiments of the invention include a method, an apparatus, a server, a client and a computer readable medium comprising a computer program stored therein, which are characterized by what is stated in the independent claims. Various embodiments of the invention are disclosed in the dependent claims.

Now there is provided a method, device and system for encoding image data from a multi-camera capture device. The encoding may utilize geometry information of the capture device and/or the captured images, and determine the appropriate coding for the image data based on the geometry information. The images may be encoded for 3D viewing with a head-mounted display (HMD), and the images may be encoded such that some areas are selected for coding with a higher quality and some other areas are selected for coding with a lower resolution, and this selection is carried out based on the geometry information. Encoding may then be carried out, and the resulting encoded signal may require a lower bandwidth compared to coding all image data with a higher quality. After decoding, the decoded image data may be rendered on a 3D HMD, where the user may be able to select the viewing direction and the images to be decoded by turning his head. That is, the source cameras of the image capture device for the images to be viewed may be selected based on the direction of the head-mounted device (the user's head).

The present disclosure may be understood to comprise a method, device, system and computer program product, where the central image region of a stereoscopic image is coded with better quality than the peripheral region in the image. The central image may correspond to such areas that are viewed in the central view of the human visual system (HVS) when the stereoscopic image is viewed with a HMD and the user is looking straight ahead, that is, the pupils are oriented essentially in the same direction as the user's head. The peripheral region may cover a peripheral scene feature, and this peripheral scene feature may be in the central image region of another stereoscopic image. In this manner, a number of stereoscopic images may be formed such that their central regions are coded with a better quality than the peripheral regions. The central regions may together essentially cover the viewing area such that when the user turns his head to view another stereoscopic image, a feature of the scene that was coded with a lesser quality in the previous image now becomes part of the central image region and is coded with a better quality. The central and peripheral regions of the stereoscopic images may be chosen using camera setup information of a multi-camera device that is used for capturing the image data for the stereoscopic images, or by determining the overlap between images from different cameras.

In yet other words, the present disclosure may be understood to relate to a method, device, system and computer program product, where a first and second stereoscopic image are formed comprising a left eye image and a right eye image, a first central image region and a first peripheral image region are determined in the first stereoscopic image, the first central image region comprising a first central scene feature and the first peripheral image region comprising a first peripheral scene feature, and in the second stereoscopic image a second central image region and a second peripheral image region in said second stereoscopic image are determined, and based on said determining that said second central image region comprises said first peripheral scene feature, encoding said first stereoscopic image such that said first peripheral image region is encoded with a reduced quality with respect to said first central image region.

Camera setup information of a multi-camera imaging device may be used in carrying out the determining that the second central image region comprises the first peripheral scene feature, wherein the camera setup information comprises information of overlapping of scene features picked up by cameras of the imaging device. The multi-camera device may comprise a number of cameras and forming at least two camera pairs for forming the first and second left eye and right eye images, the at least two camera pairs having different central view directions and information on the central view directions and switching information between the first and second left eye and right eye images may be used in determining the first central image region, the first peripheral image region and the second central image region. Scene overlap between the first stereoscopic image and the second stereoscopic image, or component images of the first stereoscopic image and the second stereoscopic image, may be detected and information of the scene overlap may be used in carrying out the determining that the second central image region comprises the first peripheral scene feature.

The first stereoscopic image may be formed in the computer memory by combining image content captured by at least two cameras for forming the first left eye image and combining image content captured by at least two cameras for forming the first right eye image. The first stereoscopic image may be formed in the computer memory by forming at least one of the first left eye image and the right eye image by rendering at least one image region using a depth image. The first stereoscopic image may be encoded such that the first peripheral image region is low-pass filtered and/or encoded with a quantization of lower quality. The first stereoscopic image may be encoded such that the first peripheral image region is encoded with a different quality for the first left eye image and the first right eye image. The first peripheral image region may be determined to comprise an image region whose distance from a center of the first stereoscopic image exceeds a threshold in horizontal direction, vertical direction or other direction. The first central image region and the first peripheral image region may be determined to both comprise whole image coding blocks such that the boundary between the first central image region and the first peripheral image region lies along coding block boundaries.

DESCRIPTION OF THE DRAWINGS

In the following, various embodiments of the invention will be described in more detail with reference to the appended drawings, in which.

DESCRIPTION OF EXAMPLE EMBODIMENTS

In the following embodiments, several features will be described in the context of stereoscopic images from a multi-camera device. It is to be noted, however, that the invention is not limited to such image capture arrangement. Furthermore, features may be described with reference to viewing the images with 3D viewing device (head-mounted 3D viewing device). It is to be noted that the invention is not limited to the described viewing device. In fact, the disclosed technology may have applications in any environment where encoding of stereoscopic images is required.

Figure 1A:
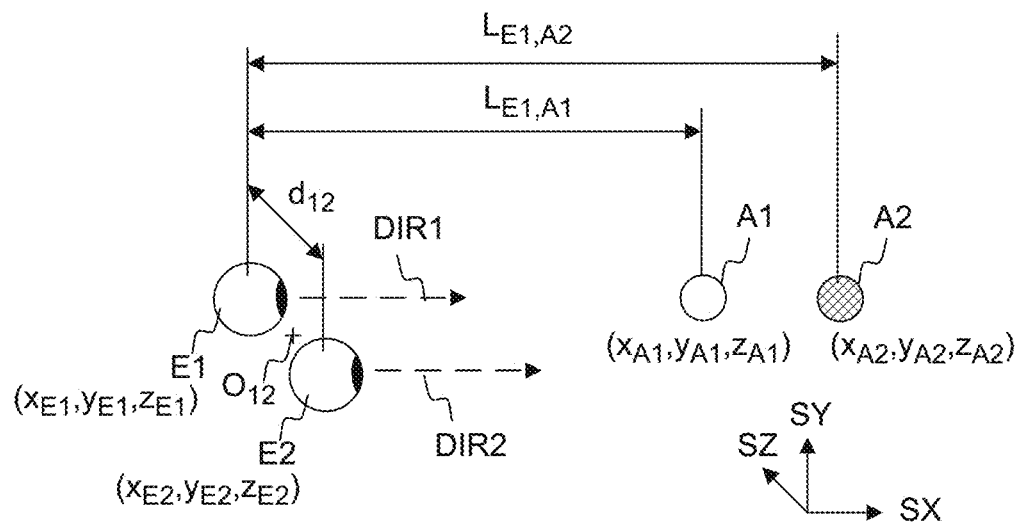
FIGS. 1a, 1b, 1c and 1d show a setup for forming a stereo image to a user.

FIGS. 1a, 1b, 1c and 1d show a setup for forming a stereo image to a user. In FIG. 1a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 1a, the spheres A1 and A2 are in the field of view of both eyes. The center-point $O_{12}$ between the eyes and the spheres are on the same line. That is, from the center-point, the sphere A2 is behind the sphere A1. However, each eye sees part of sphere A2 from behind A1, because the spheres are not on the same line of view from either of the eyes.

Figure 1B:
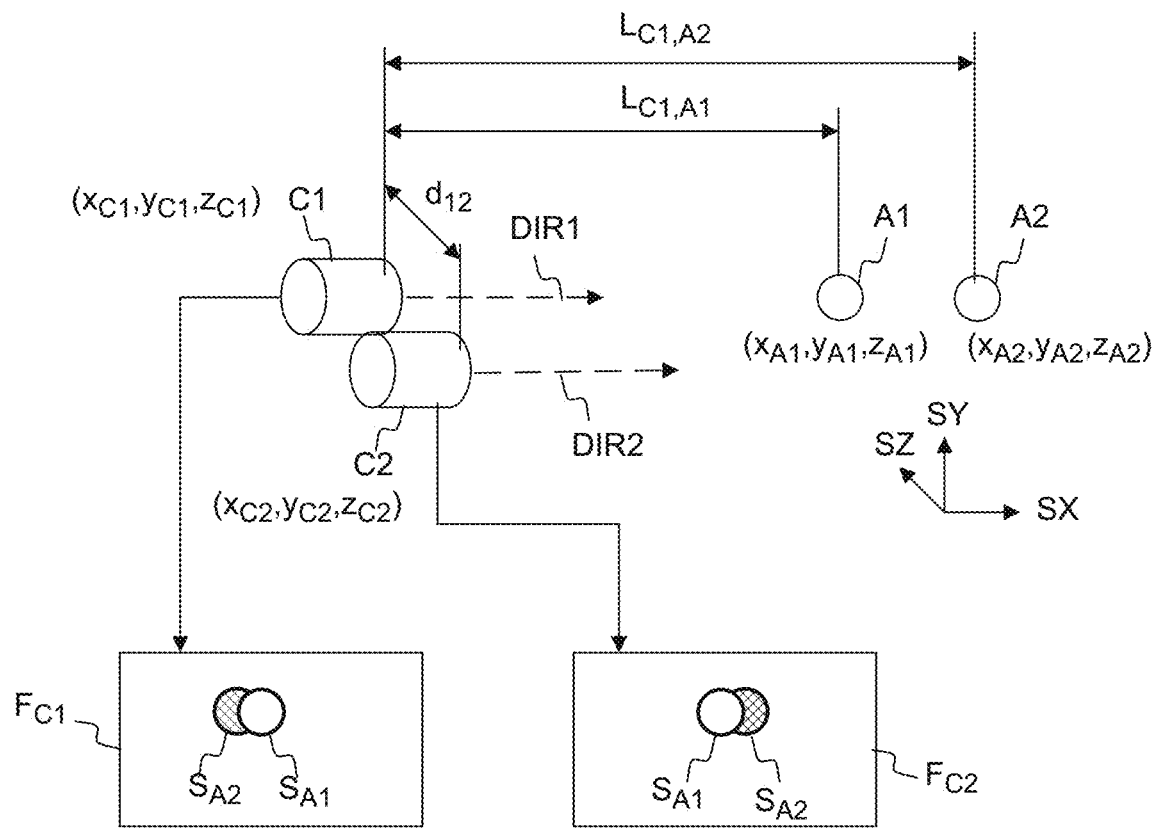

In FIG. 1b, there is a setup shown, where the eyes have been replaced by cameras C1 and C2, positioned at the location where the eyes were in FIG. 1a. The distances and directions of the setup are otherwise the same. Naturally, the purpose of the setup of FIG. 1b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 1b, where the inter-eye distances correspond to those of the eyes in FIG. 1a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

Figure 1C:
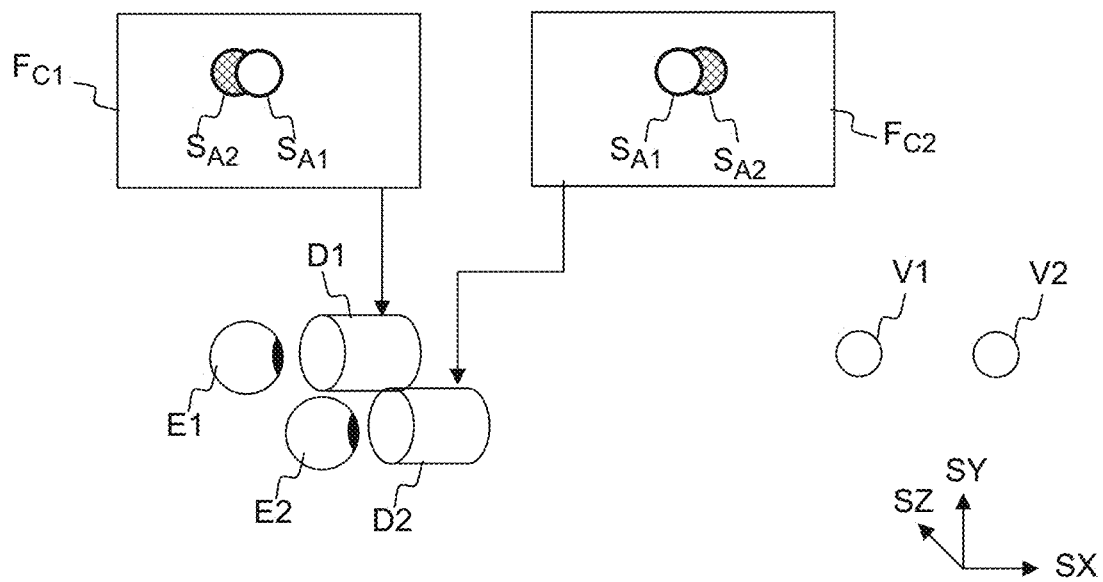

In FIG. 1c, the creating of this 3D illusion is shown. The images $F_{C1}$ and $F_{C2}$ captured by the cameras C1 and C2 are displayed to the eyes E1 and E2, using displays D1 and D2, respectively. The disparity between the images is processed by the HVS so that an understanding of depth is created. That is, when the left eye sees the image $S_{A2}$ of the sphere A2 on the left side of the image $S_{A1}$ of sphere A1, and respectively the right eye sees the image of A2 on the right side, the HVS creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the HVS.

That is, a pair of computer-generated images can be formed so that they can be used as a stereo image.

Figure 1D:
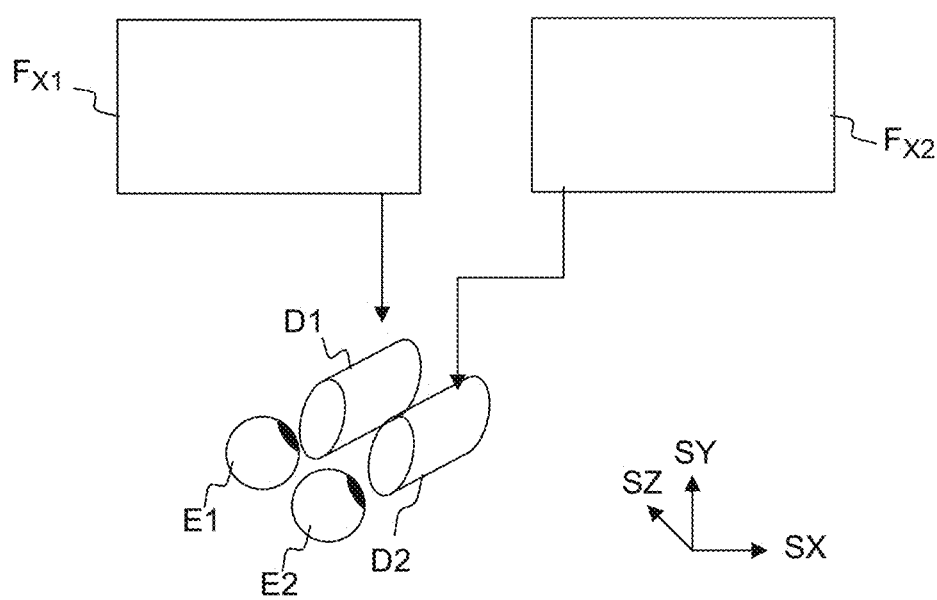

FIG. 1d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the HVS will create a cognition of a moving, three-dimensional image. When the camera is turned, or the direction of view with which the synthetic images are computed is changed, the change in the images creates an illusion that the direction of view is changing, that is, the viewer's head is rotating. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

Figure 2A:
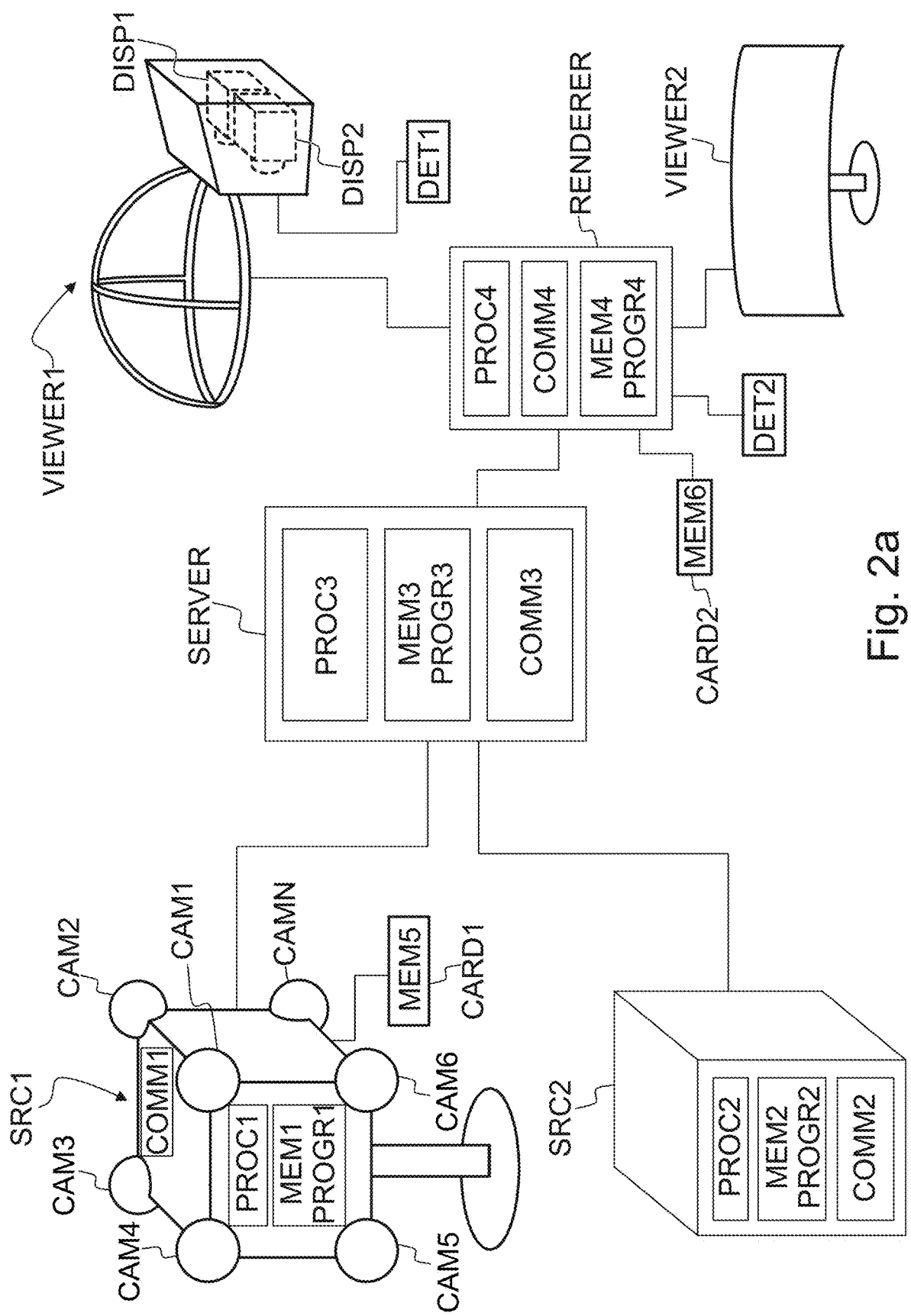
FIGS. 2a, 2b, 2c, 2d and 2e show a system and apparatuses (e.g. stereo camera and head-mounted display) for stereo viewing and illustrate the viewing process.

FIG. 2a shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information than can be captured by a single camera or microphone, in order that a viewer can determine the distance and location of objects within the scene using their eyes and their ears. As explained in the context of FIGS. 1a to 1d, to create a pair of images with disparity, two camera sources are used. In a similar manned, for the human auditory system to be able to sense the direction of sound, at least two microphones are used (the commonly known stereo sound is created by recording two audio channels). The human auditory system can detect the cues e.g. in timing difference of the audio signals to detect the direction of sound.

The system of FIG. 2a may consist of three main parts: image sources, a server and a rendering device. A video capture device SRC1 comprises multiple (for example, 8) cameras CAM1, CAM2, ..., CAMN with overlapping field of view so that regions of the view around the video capture device is captured from at least two cameras. The device SRC1 may comprise multiple microphones to capture the timing and phase differences of audio originating from different directions. The device may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the capture device. The image stream captured by the device may be stored on a memory device MEM2 for use in another device, e.g. a viewer, and/or transmitted to a server using a communication interface COMM1.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world, as explained earlier for FIG. 1d. The device SRC2 comprises or is functionally connected to a computer processor PROC2 and memory MEM2, the memory comprising computer program PROGR2 code for controlling the synthetic source device SRC2. The image stream captured by the device may be stored on a memory device MEM5 (e.g. memory card CARD1) for use in another device, e.g. a viewer, or transmitted to a server or the viewer using a communication interface COMM2.

There may be a storage, processing and data stream serving network in addition to the capture device SRC1. For example, there may be a server SERV or a plurality of servers storing the output from the capture device SRC1 or computation device SRC2. The device comprises or is functionally connected to a computer processor PROC3 and memory MEM3, the memory comprising computer program PROGR3 code for controlling the server. The server may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROGR4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing as described with FIGS. 1c and 1d. The viewer VIEWER1 comprises a high-resolution stereo-image HMD for viewing the rendered stereo video sequence. The head-mounted device may have an orientation sensor DET1 and stereo audio headphones. The viewer VIEWER2 comprises a display enabled with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2B:
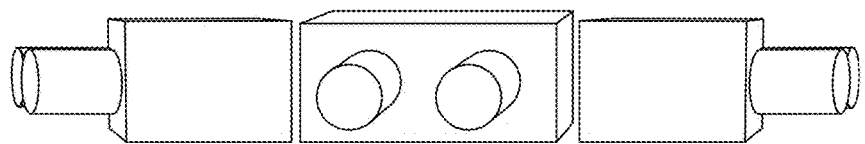

FIG. 2b shows a camera device for stereo viewing. The camera comprises three or more cameras that are configured into camera pairs for creating the left and right eye images, or that can be arranged to such pairs. The distance between cameras may correspond to the usual distance between the human eyes. The cameras may be arranged so that they have significant overlap in their field-of-view. For example, wide-angle lenses of 180 degrees or more may be used, and there may be 3, 4, 5, 6, 7, 8, 9, 10, 12, 16 or 20 cameras. The cameras may be regularly or irregularly spaced across the whole sphere of view, or they may cover only part of the whole sphere. For example, there may be three cameras arranged in a triangle and having a different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2b, three stereo camera pairs are shown.

Camera devices with other types of camera layouts may be used. A multi-camera device or system may generally be understood as any system/device including more than two cameras for capturing the surrounding area at the same time. For example, a camera device with all the cameras in one hemisphere may be used. The number of cameras may be e.g. 3, 4, 6, 8, 12, or more. The cameras may be placed to create a central field of view where stereo images can be formed from image data of two or more cameras, and a peripheral (extreme) field of view where one camera covers the scene and only a normal non-stereo image can be formed.

Examples of different camera devices that may be used in the system are described also later in this description.

Figure 2C:
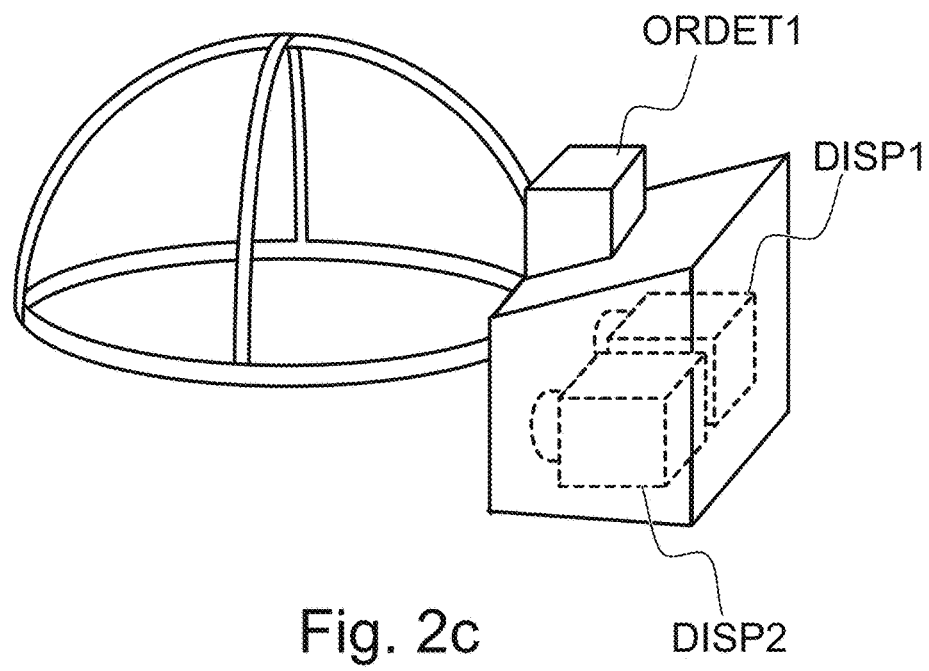

FIG. 2c shows a HMD for stereo viewing. The HMD contains two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. It is to be noted here that in this type of a device, tracking the head movement may be done, but since the displays cover a large area of the field of view, eye movement detection is not necessary. The head orientation may be related to real, physical orientation of the user's head, and it may be tracked by a sensor for determining the real orientation of the user's head. Alternatively or in addition, head orientation may be related to virtual orientation of the user's view direction, controlled by a computer program or by a computer input device such as a joystick. That is, the user may be able to change the determined head orientation with an input device, or a computer program may change the view direction (e.g. in gaming, the game program may control the determined head orientation instead or in addition to the real head orientation. In other words, with head-mounted displays (HMDs), the user can select the viewing angle by moving their head rather than being limited to one viewing angle, as is currently the case with is experienced in conventional 3D display arrangements.

Figure 2D:

FIG. 2d illustrates the user's pupil directions when viewing a stereoscopic (3D) image with a HMD; left figure shows a user looking straight forward, and right figure shows a user looking to the areas close to periphery of the image. It has been noticed here in the present application that users tend to follow a straight-ahead viewing direction while using a HMD and use their head movement to perceive the surrounding areas. In other words, to view a scene feature that is at the periphery of the viewing area, instead of turning the eyes to change the viewing direction, it has been noticed here that the users often seem to prefer to turn the head and have the pupils point straight ahead towards the center of the image. This may be attributed to the fact that the flexibility of users to move their head towards the point of interest motivates them to use head movement rather than pupil movement. It may also be easier to use the large muscles of the back and neck instead of the small muscles of the eye to adjust the viewing direction. With the functionality of the HMD where the image of the scene is changed to correspond to the head movement as described earlier, turning the head causes a different 3D image to be displayed to the user. A preferred pupil orientation of the eyes for many users as noticed here is shown in FIG. 2d on the left, while it has been noticed that users tend not to prefer viewing the image as shown in the left FIG. 2b by moving their eyes to change the viewing direction. It should be noted that it is not required to have the pupil exactly in the middle of the eye in this description, as any respective middle orientation of the eye may provide the disclosed advantages. Correspondingly, a central viewing direction of the eyes may be considered to be straight ahead or any viewing direction close to that that can be reached with normal (small) pupil direction changes that occur during a viewing process naturally. For example, the central viewing direction may be the straight-ahead viewing direction and directions deviating from that by 10-20 degrees.

Figure 2E:
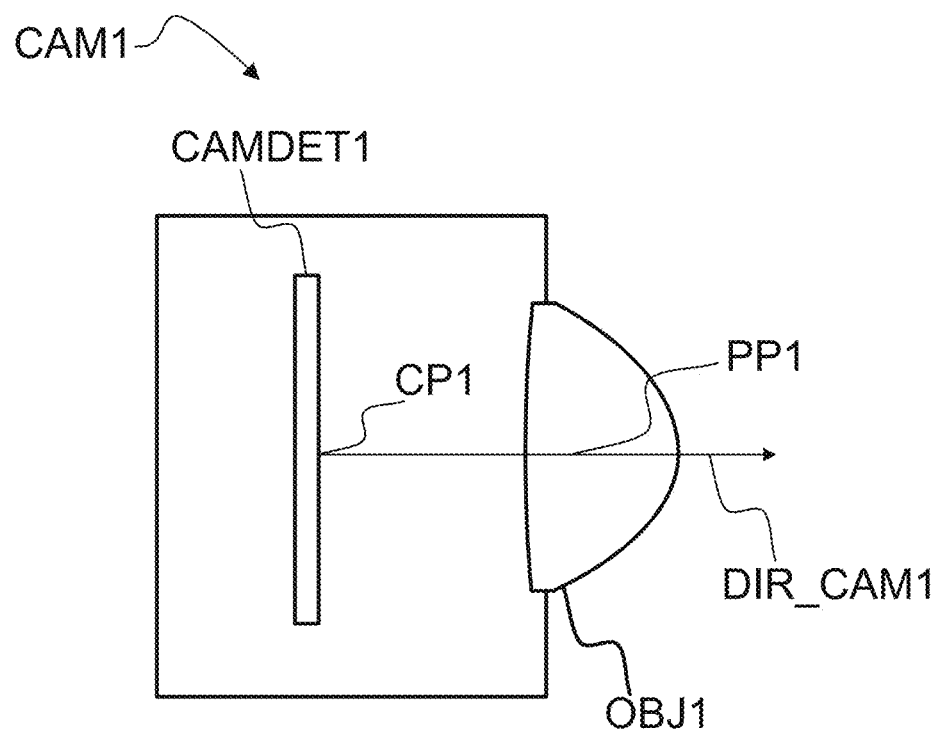

FIG. 2e illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the capture device. This can consist of multiple concurrent video and audio streams as described above. The image or video streams may be processed before transmission to reduce the bandwidth required by the streams and to reduce delays, and this have been presented later in this description. Another target for further compression of the content may be to decrease the storage capacity required for storing the video streams. This description describes decreasing the required bitrate/processing resources while displaying content captured with a multi-camera device on a HMD. For example, the central image regions corresponding to the central viewing direction may be made to have a better quality than the peripheral regions. These streams are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head mounted display and headphones.

As an example, a multi-camera device covering wide areas of the scene simultaneously may be used to capture the images. Such output content may include an image stream from e.g. 8 cameras. To reduce bandwidth required, a temporal reduction scheme may also be used. That is, the views being used currently are transmitted with higher temporal resolution than those views that are not used. Such an arrangement requires the transmitting end to know which image streams are currently used (that is, to know the viewing direction of the viewer).

Figure 3:
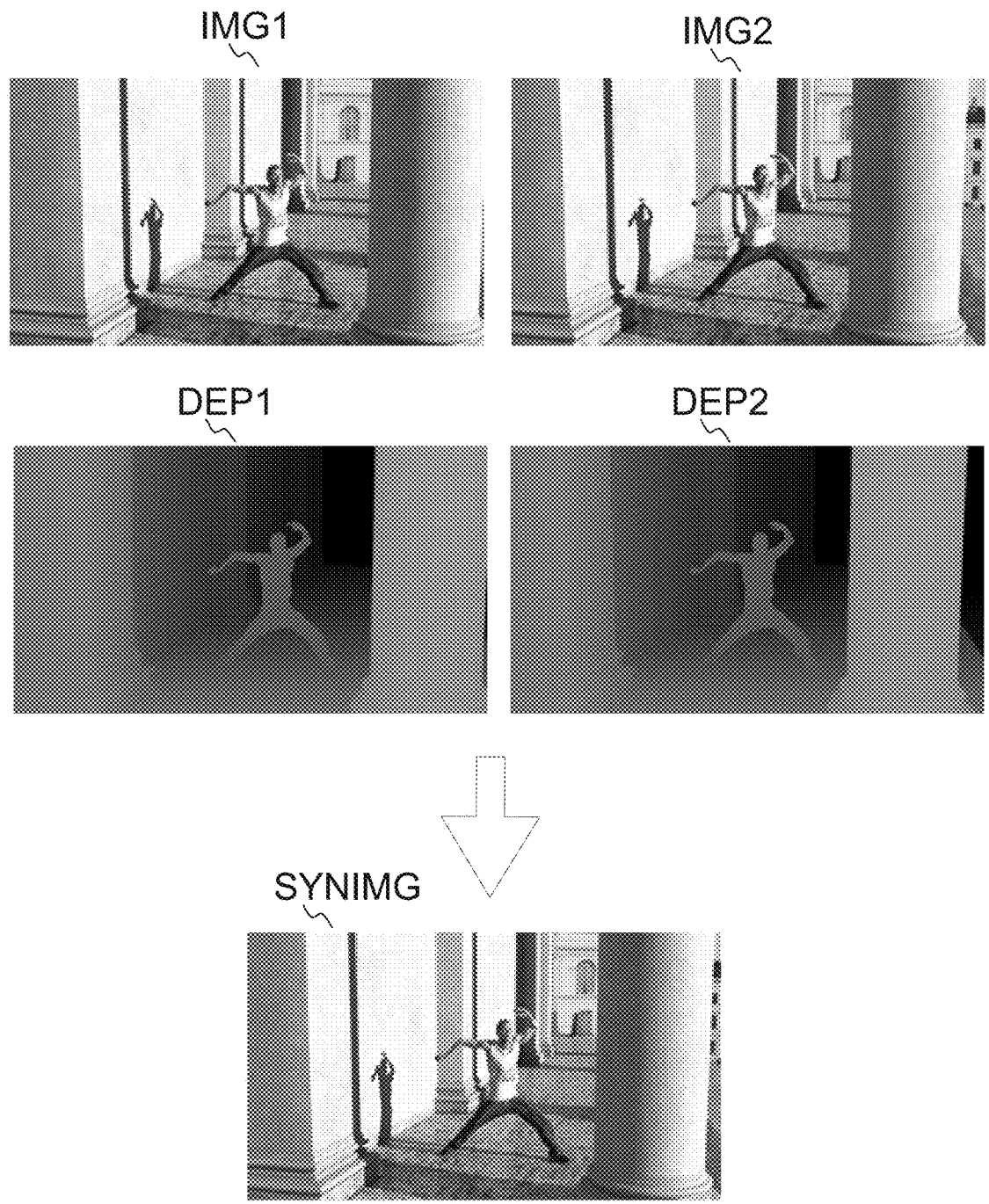
FIG. 3 illustrates image synthesis using depth images.

FIG. 3 illustrates the use of view synthesis for producing arbitrary viewing direction stereo images to be transmitted for viewing with a HMD. It should be noted that this HMD may be equipped with depth estimation sensors in order to be used in the view synthesis process. The term view synthesis may be understood as rendering of images of an observed object or scene from new viewing directions using images captured by the cameras from different viewing directions. So-called depth maps may be used in this process, where the depth maps describe how far an object at a specified image pixel location is from the camera.

Virtual view rendering may use pairs of neighboring original camera views IMG1 and IMG2 to render arbitrary virtual views on a specified camera path between them. The relation between points in 3D scene space and the values in a depth map is defined by a projection matrix, allowing for projecting and unprojecting depth data. First the depth maps DEP1 and DEP2 are unprojected, resulting in a colored 3D particle cloud for each original camera (corresponding to IMG1 and IMG2). That is, the pixels (having color) of the original captured images are placed in a 3D space by using information on how far each pixel is from the camera. Next, the projection matrix of a virtual camera is calculated from the two original cameras projection matrices by spherical linear interpolation (SLERP) and linear interpolation (LERP). These methods originate from computer graphics in the context of quaternion interpolation. Using the projection matrix of virtual cameras we have the ability to render the virtual view SYNIMG according to the virtual camera's position relative to the original cameras.

Depth-image-based rendering (DIBR) and view synthesis refer to generation of a novel view based on one or more existing/received views. Depth images are used to assist in correct synthesis of the virtual views. It should be noted that view synthesis may be done based on the texture views without using a depth map. Although differing in details, view synthesis algorithms may utilize 3D warping based on explicit geometry, i.e., depth images, where typically each texture pixel is associated with a depth pixel indicating the distance or the z-value from the camera to the physical object from which the texture pixel was sampled, as shown in FIG. 3. So-called McMillan's approach uses a non-Euclidean formulation of the 3D warping, which is efficient under the condition that the camera parameters are unknown or the camera calibration is poor. So-called Mark's approach, however, follows Euclidean formulation, assuming the camera parameters for the acquisition and view interpolation are known.

Occlusions, pinholes, and reconstruction errors are the most common artifacts introduced in the 3D warping process. These artifacts occur more frequently in the object edges, where pixels with different depth levels may be mapped to the same pixel location of the virtual image. When those pixels are averaged to reconstruct the final pixel value for the pixel location in the virtual image, an artifact might be generated, because pixels with different depth levels usually belong to different objects. Such artifacts may be corrected by using correction techniques, e.g. relying on neighboring pixel values and/or depths.

A number of approaches have been proposed for representing depth picture sequences, including the use of auxiliary depth map video streams, multi-view video plus depth (MVD), and layered depth video (LDV), which are described briefly in the sequel. The depth map video stream for a single view can be regarded as a regular monochromatic video stream and coded with any video codec. The essential characteristics of the depth map stream, such as the minimum and maximum depth in world coordinates, can be indicated in messages formatted according to the MPEG-C Part 3 standard. In the MVD representation, the depth picture sequence for each texture view is coded with any video codec, such as MVC. In the LDV representation, the texture and depth of the central view are coded conventionally, while the texture and depth of the other views are partially represented and cover only the dis-occluded areas required for correct view synthesis of intermediate views.

The detailed operation of view synthesis algorithms may depend on which representation format is used for texture views and depth picture sequences.

Figure 4A:
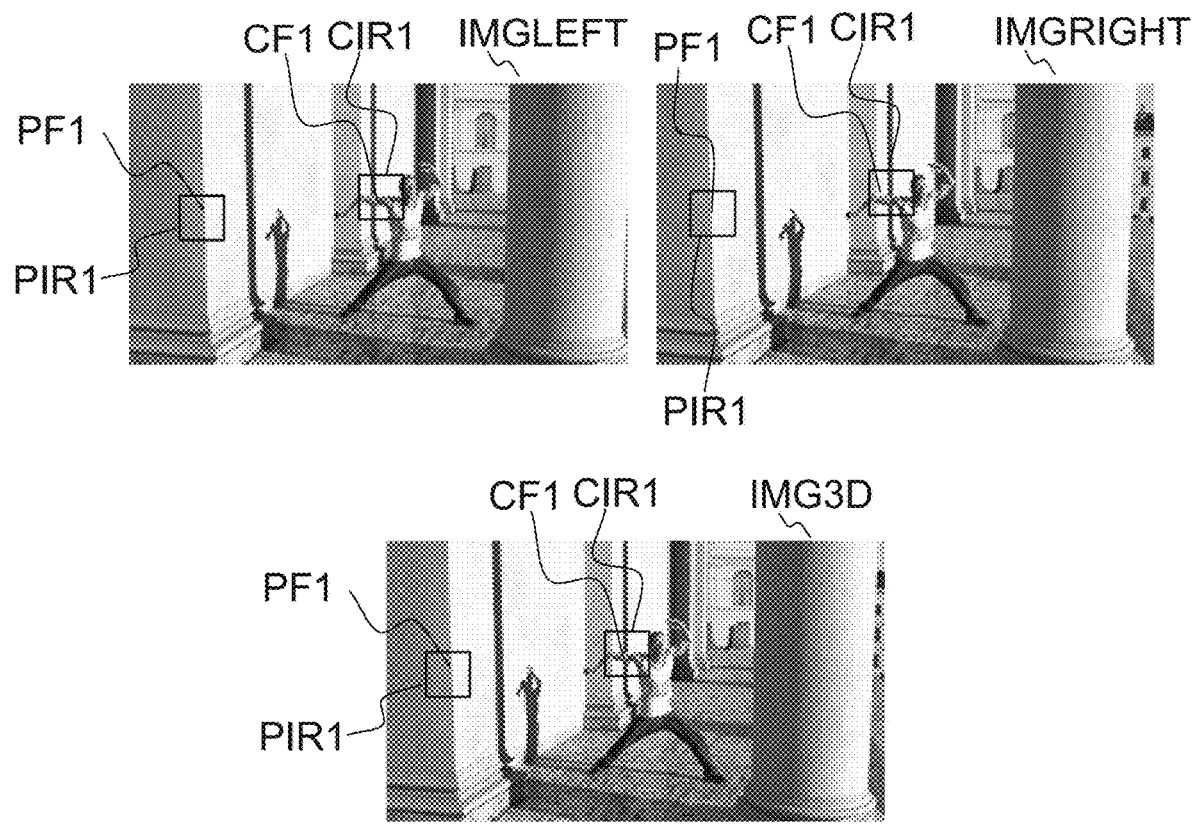
FIGS. 4a and 4b show central and peripheral scene features and central and peripheral image regions.

FIG. 4a shows central and peripheral scene features and central and peripheral image regions. The left eye image IMGLEFT and right eye image IMGRIGHT comprise a scene where there are scene features, in this case a person, a few walls and a pylon. These scene features, for example the corner of the wall as a peripheral scene feature PF1 and the arm of the person as a central scene feature CF1, give rise to the image regions captured by the camera.

Corresponding image elements here are the peripheral image region PIR1 and the central image region CIR1, present in both the left and right eye images. When the user views the images using a HMD for stereo viewing, he observes a three-dimensional image IMG3D (here shown as a two-dimensional representation). That is, the image regions and scene features are also present in the observed 3D image, although the image regions are a combination from the corresponding left and right eye image regions.

Figure 4B:
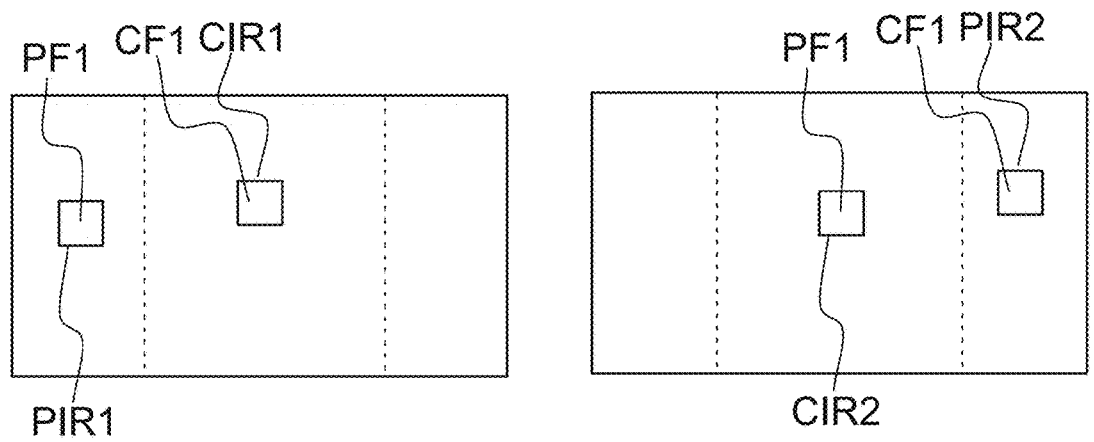

FIG. 4b illustrates the user turning his head and changing the viewing direction of the HMD. First, the scene features appear as they were in FIG. 4a. After the user has turned his head (to the left), the scene features PF1 and CF1 move to the right in the observed image (and in the left and right eye images) and now occupy different image regions. The scene feature PF1 now occupies a central image region CIR2 and the central scene feature CF1 now occupies a peripheral image region PIR2. In other words, the peripheral scene feature PF1 that was at the edge of the image first, can now in the second image be viewed in the center of the image. The change between different images may happen when a threshold is passed, and there may be hysteresis in this change such that flickering between views is not happening. Also, the shift between images may be blended to make it visually more appealing.

Based on this property of images in different viewing directions, a peripheral image region may be encoded or processed to have reduced quality, because the feature in that peripheral region can be viewed in a central region of another image in another viewing direction. The determining of which regions are peripheral and can be encoded or processed to have reduced quality can be made based on camera setup information or by detecting the overlap of different images. The determining may happen so that different views have central image regions covering different scene features. In this way, the user can see a scene feature sharply when he turns his head towards that feature. The central image region or regions may also be different between views.

As described above, the users of a HMD may prefer viewing the image straight ahead. Therefore, it has been noticed here that the central image region CIR1, CIR2 may be coded with a better quality than the peripheral region PIR1, PIR2 without significant reduction in perceived quality of the image. Furthermore, various quality assessment methods may be used to ensure that lowering the image quality for reducing the bandwidth keeps the perceived quality in an acceptable level.

Such quality assessment methods for 3D video are presented next, along with different processing steps that may be applied to the video/image streams.

Digital images typically undergo a wide variety of distortions from acquisition to transmission and display, which usually result in the degradation of the subjective quality. Image quality assessment (IQA) is an approach to calculate the extent of the quality loss. Moreover, IQA is used to evaluate the performance of processing systems e.g. different codecs and enables the selection of different tools and their associated parameters to optimize the processing steps. The parameters that are selected for processing and encoding may thus depend on the camera configuration or image stream setup and the predefined target perceived quality level.

For the majority of processed digital images, the HVS is the ultimate receiver and is the most reliable way of performing the IQA and evaluate their quality based on subjective experiments (defined in ITU-R Recommendation BT.500, 500-11, methodology for the subjective assessment of the quality of television pictures," International Telecommunication Union, Geneva, Switzerland, 2002).

Asymmetric quality between the views may also be introduced by processing, and the available objective metrics may need to be adapted to approximate the perceived quality of asymmetric stereoscopic video. Such asymmetry may be presented to the whole image, just the central region of the image, or just a peripheral region of the image surrounding the central part as mentioned above. When asymmetric quality is introduced to the whole image (for the cases where central quality of each image is higher than the quality for the peripheral region of the image), both the central and the peripheral region of the image have different quality compared to the other view. Another case is where only the quality of the central part differs between the views. Yet another alternative is when the quality of the central part is similar (may be the highest quality in the preferred embodiment) and the quality of the peripheral region of images differ.

Objective quality assessment metrics are traditionally categorized to three classes of full-reference (FRef), reduced-reference (RRef), and no-reference (NRef). This depends on whether a reference, partial information about a reference, or no reference is available and used in evaluating the quality, respectively.

In full-reference metrics, the level of degradation in a test video is measured with respect to the reference which has not been compressed or processed in general. Moreover, it imposes precise temporal and spatial alignment as well as calibration of color and luminance components with the distorted stream. However, in most real time video systems, the evaluation with full- and reduced-reference methods are limited since the reference is not available and in most cases no information other than the distorted stream is provided to the metric. In the present description, full reference method may be used between the original captured image data and the image data processed and/or encoded for transmission.

No-reference metrics mostly make some assumptions about the video content and types of distortion and based on that, try to separate distortions from the content. Since no explicit reference video is needed, this scheme is free from alignment issues and hence, it is not as accurate as FRef metrics.

The relative-reference metrics are a tradeoff between full-reference and no-reference metrics in terms of availability of the reference information. These metrics extract a number of features from the reference video and perform the comparison only on those features. This approach keeps the amount of reference information manageable while avoiding some assumptions of no-reference metrics. There exist several different methods on how to measure the objective quality through automated computational signal processing techniques.

Based on the quality assessment with any assessment method, parameters for processing and/or encoding may be selected. Such parameters may include e.g. low-pass filtering parameters, quantization parameters and/or the selection image regions for higher and lower quality.

Subjective video quality assessment methods are based on one or several groups of naïve or trained subjects viewing the video content, and scoring the quality of the shown content. Moreover, these tests should meet the ITU-T recommendations for subjective quality assessment and hence, the tests must follow strict conditions e.g. room illumination, viewing distance, test duration, content presentation, and evaluators' selection. Considering the duration of the test, it cannot be used in cases where a fast judgment needs to be made, e.g. the decisions which are made at the encoder to optimize the coding parameters. As the results of subjective quality assessments are quite precise, subjective quality assessment is the most common approach used for formal quality evaluation. Subjective quality assessment may be used to select parameters for processing and/or encoding.

A method of low-pass filtering targets removing the high frequency components while keeping the spatial resolution and general structure of the image untouched. This enables the compression of the same content with reduced number of bits since less detail (high frequency components) need to be encoded. In the case where videos are presented in polarized displays, a down-sampling with ratio 1/2 along the vertical direction is applied to the content. This is because the vertical spatial resolution of the display is divided between the left and right view and hence, each one has half the vertical resolution. In such cases, depending on the display and content, an aliasing artifact might be introduced while perceiving the stereoscopic content. However, applying LPF reduces such artifact considerably since the high frequency components responsible for the creation of aliasing are removed in a pre-processing stage.

Figure 5A:
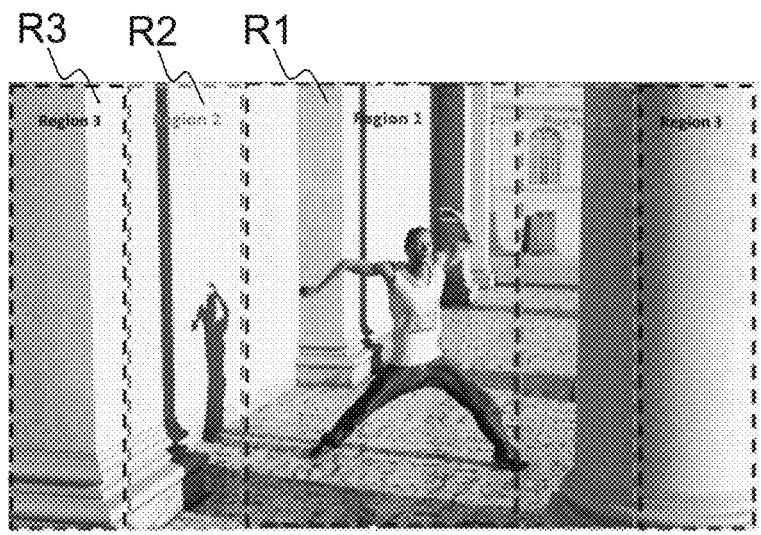
FIGS. 5a, 5b and 5c show some different ways of selecting image regions for coding.
Figure 5B:
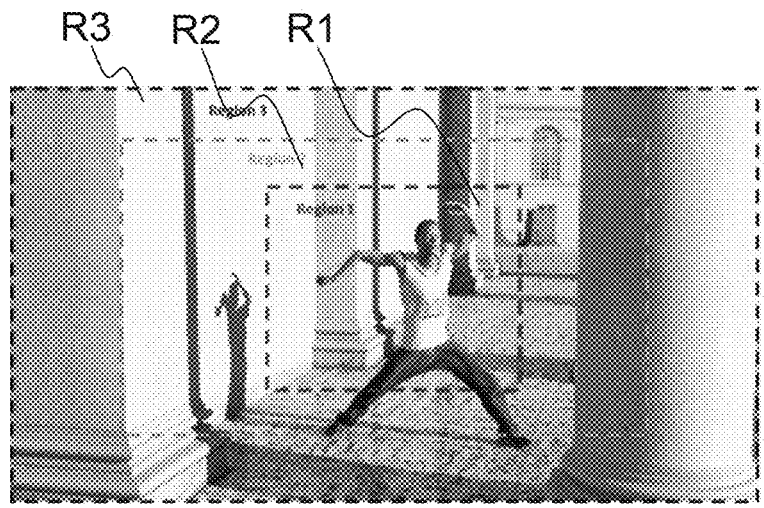

In FIGS. 5a, 5b and 5b, some example ways of creating image regions (e.g. central and peripheral regions, or more) are shown.

As described earlier, while perceiving a content, captured with a multi-camera device, using a HMD the user tends to watch straight forward most of the time as he has the option to move his head to watch the surrounding area. This is not the same case for conventional 3D displays as the viewing angle is fixed and to watch some content e.g. in the up-corner the only way is to look at it (with or without moving the head). However, in any HMD it is conveniently possible to move your head to that specific direction rather than straining your eyes to sneak on those areas by keeping your pupil on the edges of your cornea.

Therefore, for viewing with HMDs or any displays where the user is looking at the center of the display, it has been realized here that the center part of the images should have good perceived quality while the image quality can be decreased moving towards the peripheral regions (e.g. stepwise in one or more steps or gradually). Selecting these regions can benefit from a known camera setup structure, such as the thresholds where views are switched between pair of cameras, the viewing zone/angle of cameras, and their respective orientation/location.

For the bitrate reduction, for example low-pass filtering or stronger encoding compression of regions of a view closer to its boundaries as the users tend to follow a straight viewing line while using a HMD and use their head movement to perceive the surrounding areas may be used.

The different images may be sliced to different regions as follows.

In FIG. 5a, the regions are formed by dividing the image vertically, with a central region R1 and going to sides (peripheral regions R2 and R3) the quality of the content decreases. In FIG. 5a, region 1 has the highest quality while region 2 and 3 have lower qualities, respectively. In other words, the further the central region, the lower the quality of the peripheral region may be.

In FIG. 5b, the regions have a rectangular shape. The central region may not extend to the image edge. This is shown in FIG. 5b such that the regions are nested inside each other, where the central region R1 is in the middle and peripheral regions R2 and R3 are around it. Here, region R1 has the highest quality and regions R2 and R3 have lower qualities, respectively. Again, the further the central region, the lower the quality of the peripheral region may be.

Figure 5C:
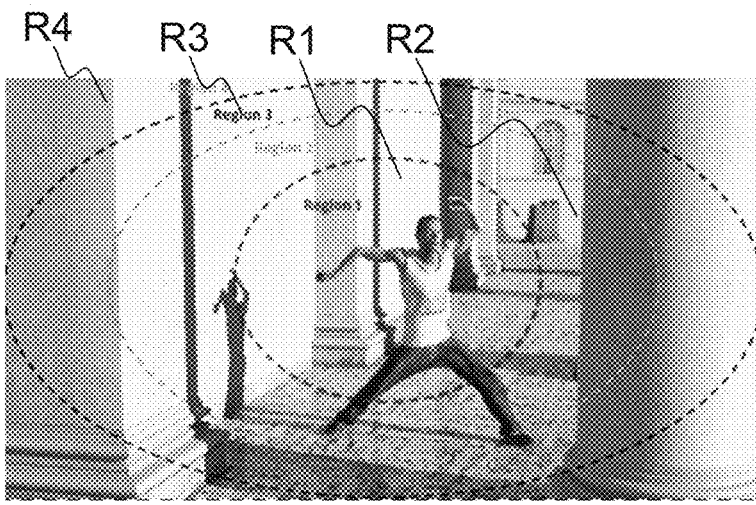

In FIG. 5c, some regions have an oval shape covering most of the image while allocating the remaining part of image to a separate region. The regions are nested inside each other. This is shown in FIG. 5c such where region R1 has the highest quality and regions R2, R3, and R4 have lower qualities, respectively.

In FIGS. 5a, 5b and 5c, and generally, the regions can be selected in a block-based approach where central blocks have a higher quality and side blocks will have a lower quality. This approach is well aligned with hybrid codecs working on block based compression algorithms as the quantization parameters of entire blocks can be changed.

Any other shapes than the rectangular and elliptical shapes may be used.

Any combination of divisions presented in FIGS. 5a, 5b, and 5c may be used. For example, combining FIG. 5b and FIG. 5c the regions may be either rectangular or oval shape nested within each other.

The quality degradation on different regions can be achieved, but not limited to, any of the methods described below.

Application of low-pass filter removes high frequency components and details from the view without changing the skeleton of the image (lower frequency components). This is a convenient method to be applied as the parameters can be tuned easily based on the requirement and can be applied as a pre-processing step prior to the actual encoding.

The quantization parameter of the encoding codec for the regions which are to be encoded stronger can be increased. This means that more compression will be achieved in these areas while the quality will be reduces respectively. Such higher quantization parameter may be applied on the discrete cosine transform (DCT) coefficients of block-based image coding.

Pixel sample values may also be quantized directly. In this approach, the pixel values of each region are quantized utilizing a different quantization step size. Such quantization is applied to pixel values of spatial locations allocated to different regions (e.g. regions presented in FIGS. 5a, 5b, and 5c). This is done by changing the scaling range e.g. following the same algorithm used for the weighted prediction mode of the H.264/AVC standard:

$$q = \text{round}\left(\frac{i \times w}{2^d}\right) = (i \times w + 2^{d-1}) \gg d$$

where:

$q$ is the quantized sample value round is a function returning the closest integer $i$ is the input value of the luma sample $w$ is the explicit integer weight ranging from 1 to 127

$d$ is the base 2 logarithm of the denominator for weighting

This equation is the same formula used in H.264/AVC weighted prediction and $\frac{w}{2^d}$ is referred to as the luma value quantization ratio.

Also, any combination of aforementioned methods, or a combination with other methods may be used.

The number of regions by which the image is covered may be arbitrary while the larger the number of regions, the smoother the transition between regions and qualities and hence, the less the perceived potential artifacts by user due to transition between the regions.

The quality degradation on regions may be symmetric with respect to the center of the image, however, an asymmetric quality degradation may be used, too. Such selection can be done based on the camera setup in the multicamera device e.g. cameras on the extreme left and right could have asymmetric quality for peripheral regions.

While applying view synthesis algorithms to render the middle views, to be shown to the end user wearing the HMD, this approach may be beneficial as again the middle parts of the rendered image have a high quality while the side areas have a relatively lower quality. This is due to the fact that the view synthesis uses the respective pixels of side reference views to render the middle view and hence, has a similar quality as the reference views. This also makes a smoother transition between original images and rendered ones as the general regions structure and quality of different parts of the images are well aligned. As the details of the peripheral parts of the reference images are reduced, the view synthesis process may also perform faster. This may contribute to achieving a higher quality real-time presentation of the content for displaying on HMDs.

The amount of quality degradation depends on the required amount of bitrate reduction on the content and depends on the application and tuning parameters. This can also get an input from the user to increase the real-time speed of the view presentation in the HMDs. The smaller bitrate and smaller amount of detail may have effect on the decoding process and hence, can increase the decoding speed. Therefore, the user may select to increase the decoding speed by selecting a decreased peripheral regions quality.

The region of interest selection may vary between different images (cameras) based on the location, orientation, and parameters of that camera and the surrounding ones.

The encoding and pre-processing may be tuned with any desired specific camera setup of a multi-camera device, taking into account the cameras location/orientation, cameras field of view, and thresholds by which change between cameras happen. However, as it may be possible to render virtual views from different viewing points to the user, the camera locations may not matter that much since for any direction a new pair of views will be rendered. In such a case, the virtual camera setup information of image overlap information may anyway be used to determine the central and peripheral image regions. A combination of the available camera setup and criteria on rendering the virtual views may be used to determine the central and peripheral regions' selection on different views.

Figure 6A:
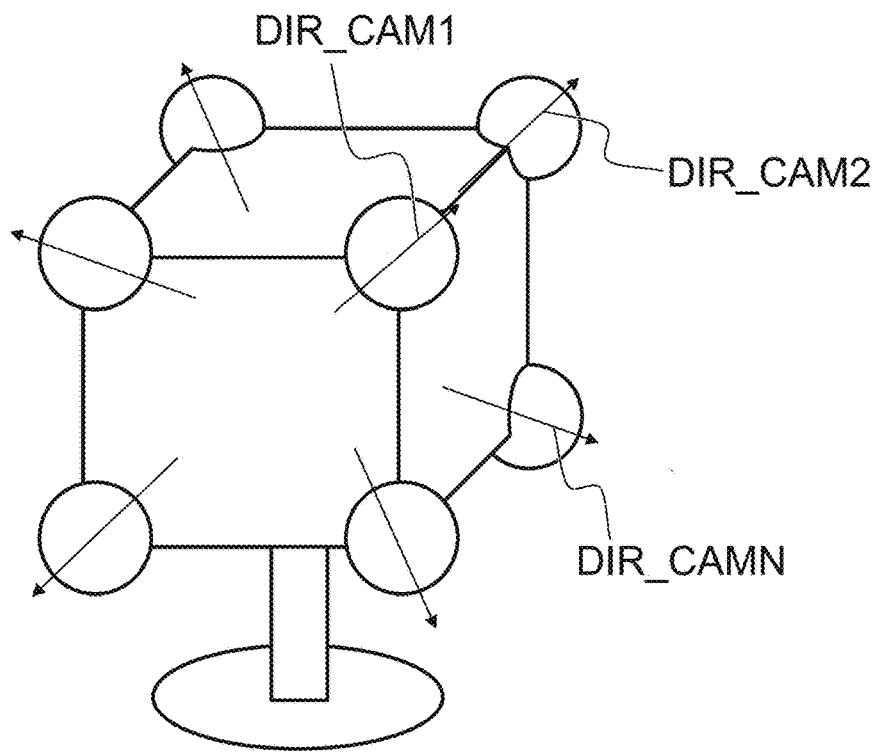
FIGS. 6a, 6b, 6c and 6d illustrate different camera setups and determining the image regions using camera setup information.

FIG. 6a shows an example of a camera device for being used as an image source. To create a full 360 degree stereo panorama every direction of view may be photographed from two locations, one for the left eye and one for the right eye. In case of video panorama, these images may be shot simultaneously to keep the eyes in sync with each other. As one camera cannot physically cover the whole 360 degree view, at least without being obscured by another camera, there need to be multiple cameras to form the whole 360 degree panorama. Additional cameras however increase the cost and size of the system and add more data streams to be processed. This problem becomes even more significant when mounting cameras on a sphere or platonic solid shaped arrangement to get more vertical field of view.

However, even by arranging multiple camera pairs on for example a sphere or platonic solid such as octahedron or dodecahedron, the camera pairs will not achieve free angle parallax between the eye views. The parallax between eyes is fixed to the positions of the individual cameras in a pair, that is, in the perpendicular direction to the camera pair, no parallax can be achieved. This is problematic when the stereo content is viewed with a head mounted display that allows free rotation of the viewing angle around z-axis as well.

In FIG. 6a, the cameras have been positioned at the corners of a virtual cube, having orientations DIR_CAM1, DIR_CAM2, ..., DIR_CAMN essentially pointing away from the center point of the cube. Naturally, other shapes, e.g. the shape of a cuboctahedron, or other arrangements, even irregular ones, can be used.

Overlapping super wide field of view lenses may be used so that a camera can serve both as the left eye view of a camera pair and as the right eye view of another camera pair. This reduces the amount of needed cameras to half. As a surprising advantage, reducing the number of cameras in this manner increases the stereo viewing quality, because it also allows to pick the left eye and right eye cameras arbitrarily among all the cameras as long as they have enough overlapping view with each other. Using this technique with different number of cameras and different camera arrangements such as sphere and platonic solids enables picking the closest matching camera for each eye achieving also vertical parallax between the eyes. This is beneficial especially when the content is viewed using head mounted display. The described camera setup, may allow to create stereo viewing with higher fidelity and smaller expenses of the camera device.

The selection of camera pairs above may also be combined with the creation of synthetic stereoscopic images between the camera viewing directions, for example as described in the context of FIG. 3.

The wide field of view allows image data from one camera to be selected as source data for different eyes depending on the current view direction, minimizing the needed number of cameras. The spacing can be in a ring of 5 or more cameras around one axis in the case that high image quality above and below the device is not required, nor view orientations tilted from perpendicular to the ring axis.

In case high quality images and free view tilt in all directions is required, for example a cube (with 6 cameras), octahedron (with 8 cameras) or dodecahedron (with 12 cameras) may be used. Of these, the octahedron, or the corners of a cube (FIG. 6a) is a possible choice since it offers a good trade-off between minimizing the number of cameras while maximizing the number of camera-pairs combinations that are available for different view orientations.

The camera device may comprise at least three cameras in a regular or irregular setting located in such a manner with respect to each other that any pair of cameras of the at least three cameras has a disparity for creating a stereo image having a disparity. The at least three cameras have overlapping fields of view such that an overlap region for which every part is captured by the at least three cameras is defined. Any pair of cameras of the at least three cameras may have a parallax corresponding to parallax of human eyes for creating a stereo image. For example, the parallax (distance) between the pair of cameras may be between 5.0 cm and 12.0 cm, e.g. approximately 6.5 cm. Such a parallax may be understood to be a natural parallax or close to a natural parallax, due to the resemblance of the distance to the normal inter-eye distance of humans. The at least three cameras may have different directions of optical axis. The overlap region may have a simply connected topology, meaning that it forms a contiguous surface with no holes, or essentially no holes so that the disparity can be obtained across the whole viewing surface, or at least for the majority of the overlap region. In some camera devices, this overlap region may be the central field of view around the viewing direction of the camera device. The field of view of each of the at least three cameras may approximately correspond to a half sphere. The camera device may comprise three cameras, the three cameras being arranged in a triangular setting, whereby the directions of optical axes between any pair of cameras form an angle of less than 90 degrees. The at least three cameras may comprise eight wide-field cameras positioned essentially at the corners of a virtual cube and each having a direction of optical axis essentially from the center point of the virtual cube to the corner in a regular manner, wherein the field of view of each of the wide-field cameras is at least 180 degrees, so that each part of the whole sphere view is covered by at least four cameras.

The human interpupillary (IPD) distance of adults may vary approximately from 52 mm to 78 mm depending on the person and the gender. Children have naturally smaller IPD than adults. The human brain adapts to the exact IPD of the person but can tolerate quite well some variance when rendering stereoscopic view. The tolerance for different disparity is also personal but for example 80 mm disparity in image viewing does not seem to cause problems in stereoscopic vision for most of the adults. Therefore, the optimal distance between the cameras is roughly the natural 60-70 mm disparity of an adult human being but depending on the viewer, the invention works with much greater range of distances, for example with distances from 40 mm to 100 mm or even from 30 mm to 120 mm. For example, 80 mm may be used to be able to have sufficient space for optics and electronics in a camera device, but yet to be able to have a realistic natural disparity for stereo viewing.

Figure 6B:
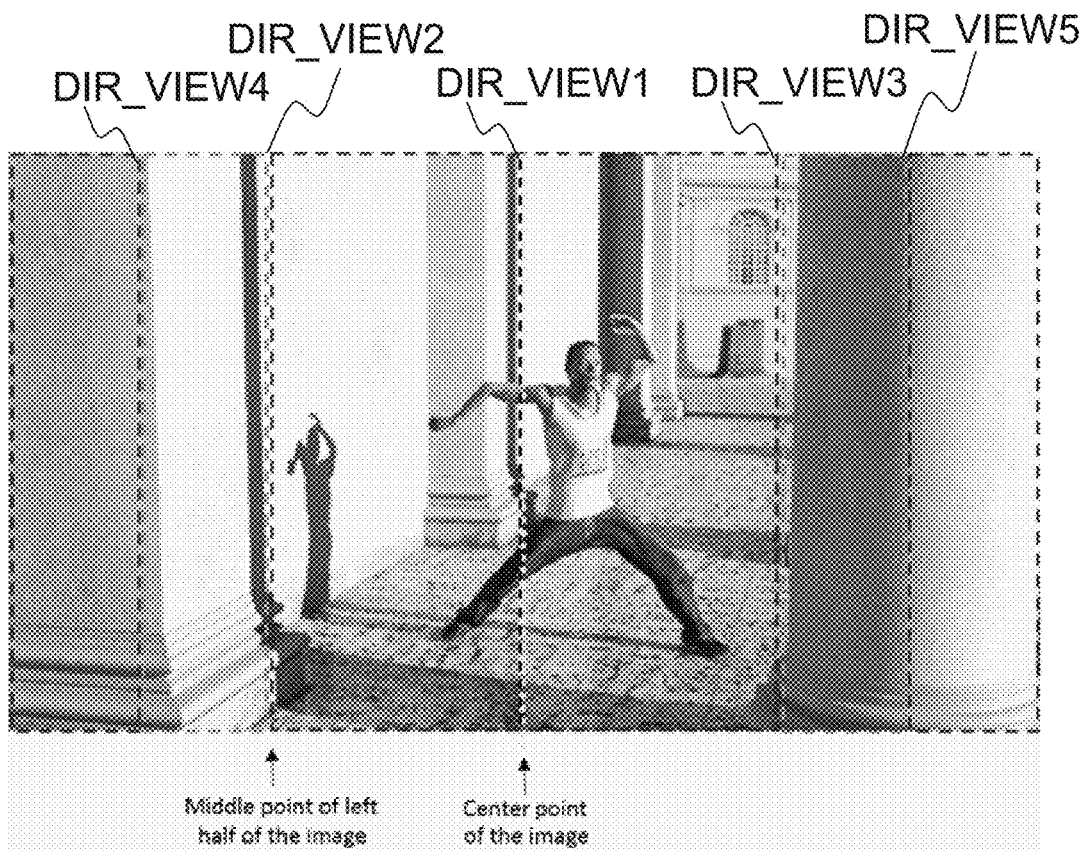
Figure 6C:
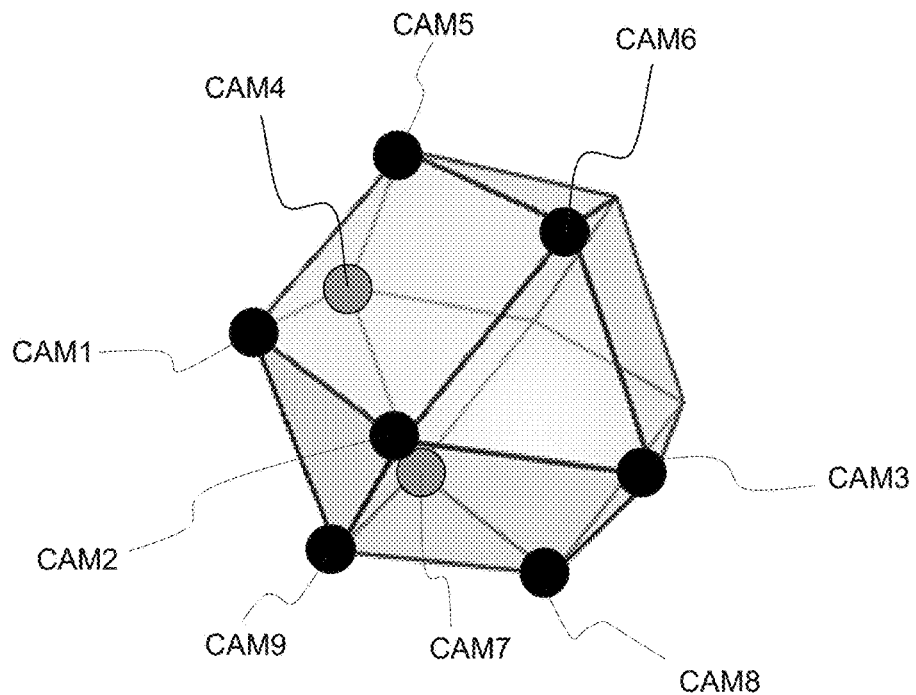
Figure 6D:
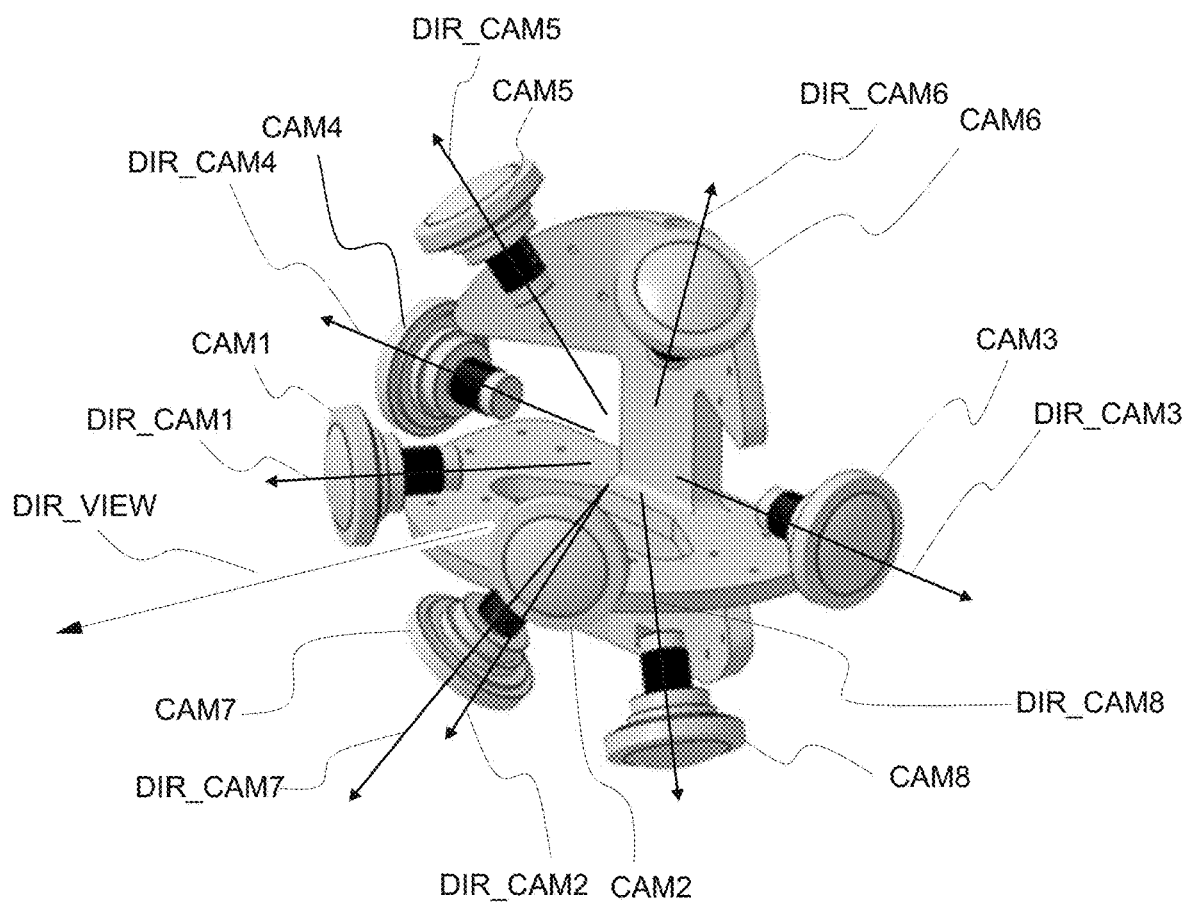

In a specific camera setup, e.g. such as in FIGS. 6c and 6d, a predetermined division to central and peripheral image regions may be used. Since the angle difference between the cameras in the horizontal row is 60 degrees, it may be assumed that the change from one pair of cameras to the other pair happens approximately when the head movement passes the 30 degree change. This may e.g. mean half of the distance between the center of the image and the lateral edge of the image. In FIG. 6b, the center point is at the central viewing direction DIR_VIEW1 of the image, that is, in view direction straight ahead. A left switching point may be e.g. at the midpoint DIR_VIEW2 and the right switching point may be e.g. at the midpoint DIR_VIEW3. The left and right switching points may be at the same distance from the central viewing direction, or at different distances. When the left/right switching point DIR_VIEW2 or DIR_VIEW3 has been passed, the image is switched to another image, e.g. corresponding to a different camera pair or having been created by view synthesis Therefore, if the quality of middle part of the image is kept intact, as shown in FIG. 6b, then the user may perceive the quality to remain constant watching straight forward before the camera pair is changed. Such knowledge about the camera orientation helps selecting the location/shape of different regions. In this scenario, the middle two dashed line rectangles represent region 1 associated with the highest quality covering the center areas visible to eyes while pupil is located in center area of the eye. The selection of number and location of other regions (in FIG. 6b, peripheral regions at the sides of the image) can be selected based on average amount of pupil location divergence form the center of the eye. For example, if it is determined that the average pupil location divergence is large, the left and right switching points may be selected to be further from the central viewing direction, for example at directions DIR_VIEW4 and DIR_VIEW5.

A cuboctahedral shape for placing cameras in a multi-camera device is shown in FIG. 6c. A cuboctahedron consists of a hexagon, with an equilateral triangle above and below the hexagon, the triangles' vertices connected to the closest vertices of the hexagon. All vertices are equally spaced from their closest neighbours. One of the upper or lower triangles can be rotated 30 degrees around the vertical axis with respect to the other to obtain a modified cuboctahedral shape that presents symmetry with respect to the middle hexagon plane. Cameras may be placed in the front hemisphere of the cuboctahedron. Four cameras CAM1, CAM2, CAM3, CAM4 are at the vertices of the middle hexagon, two cameras CAM5, CAM6 are above it and three cameras CAM7, CAM8, CAM9 are below it.

An example eight camera system is shown as a 3D mechanical drawing in FIG. 6d, with the camera device support structure present. The cameras are attached to the support structure that has positions for the cameras. In this camera system, the lower triangle of the cuboctahedron has been rotated to have two cameras in the hemisphere around the viewing direction of the camera device.

In this and other camera devices, a camera device has a number of cameras, and they may be placed on an essentially spherical virtual surface (e.g. a hemisphere around the view direction DIR_VIEW). In such an arrangement, all or some of the cameras may have their respective optical axes passing through or approximately passing through the center point of the virtual sphere. A camera device may have, like in FIGS. 6c and 6d, a first central camera CAM2 and a second central camera CAM1 with their optical axes DIR_CAM2 and DIR_CAM1 displaced on a horizontal plane (the plane of the middle hexagon) and having a natural disparity. There may also be a first peripheral camera CAM3 having its optical axis DIR_CAM3 on the horizontal plane oriented to the left of the optical axis of central camera DIR_CAM2, and a second peripheral camera having its optical axis DIR_CAM4 on the horizontal plane oriented to the right of the optical axis of central camera DIR_CAM1. In this arrangement, the optical axes of the first peripheral camera and the first central camera, the optical axes of the first central camera and the second central camera, and the optical axes of the second central camera and the second peripheral camera, form approximately 60 degree angles, respectively. In the setting of FIG. 6d, two peripheral cameras are opposite to each other (or approximately opposite) and their optical axes are aligned albeit of opposite direction. In such an arrangement, with wide angle lenses, the fields of the two peripheral cameras may cover the full sphere, possibly with some overlap.

In FIG. 6d, the camera device also has the two central cameras CAM1 and CAM2 and four peripheral cameras CAM3, CAM4, CAM5, CAM6 disposed at the vertices of an upper front quarter of a virtual cuboctahedron and two peripheral cameras CAM7 and CAM8 disposed at locations mirrored with respect to the equatorial plane (plane of the middle hexagon) of the upper front quarter of the cuboctahedron. The optical axes DIR_CAM5, DIR_CAM6, DIR_CAM7, DIR_CAM8 of these off-equator cameras may also be passing through the center of the camera device.

Figure 7:
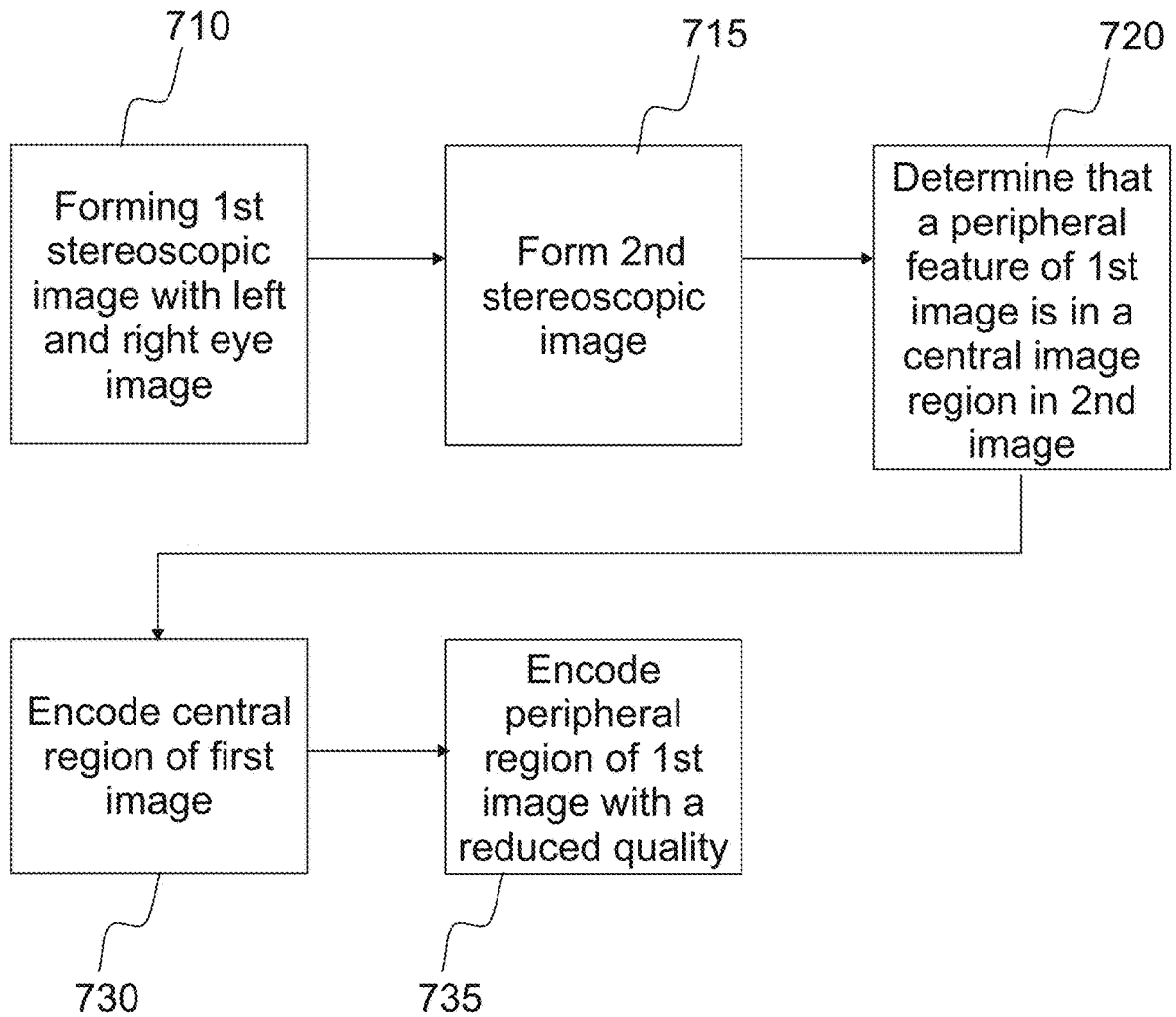
FIG. 7 shows a flow chart of a method for processing and/or encoding stereo images.

In FIG. 7, a flow chart of a method for use with multi-camera devices is shown. In phase 710, a first stereoscopic image is formed in a computer memory, the first stereoscopic image comprising a first left eye image and a first right eye image. For this image, a first central image region and a first peripheral image region in the first stereoscopic image may be determined, the first central image region comprising a first central scene feature and the first peripheral image region comprising a first peripheral scene feature. In phase 715, a second stereoscopic image is formed in a computer memory, the second stereoscopic image comprising a second left eye image and a second right eye image. In phase 720, a second central image region and a second peripheral image region may be determined in the second stereoscopic image, and here it is determined (e.g. using camera setup information) that the second central image region comprises the first peripheral scene feature. In phase 730, the central region is encoded. Based on the determining that the second central image region comprises the first peripheral scene feature, in phase 735 the first stereoscopic image may be encoded such that the first peripheral image region is encoded with a reduced quality with respect to the first central image region.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
   forming in a computer memory a first stereoscopic image, said first stereoscopic image comprising a first left eye image and a first right eye image,
   determining a first central image region and a first peripheral image region in said first stereoscopic image, said first central image region comprising a first central scene feature and said first peripheral image region comprising a first peripheral scene feature,
   forming in said computer memory a second stereoscopic image, said second stereoscopic image comprising a second left eye image and a second right eye image,
   determining a second central image region and a second peripheral image region in said second stereoscopic image, said second central image region comprising said first peripheral scene feature, and based on said determining that said second central image region comprises said first peripheral scene feature, encoding said first stereoscopic image such that said first peripheral image region is encoded with a reduced quality with respect to said first central image region.

2. A method according to claim 1, wherein said determining, that said second central image region comprises said first peripheral scene feature, comprises:
using camera setup information of a multi-camera imaging device in carrying out said determining, wherein said camera setup information comprises information of overlapping of scene features picked up by cameras of said multi-camera imaging device.

3. A method according to claim 2, further comprising:
forming at least two camera pairs for forming said first left eye image, first right eye image, second left eye image, and second right eye image, said at least two camera pairs having different central view directions, and
using information on said central view directions and switching information between said first left eye image, first right eye image, second left eye image, and second right eye image in determining said first central image region, said first peripheral image region and said second central image region.

4. A method according to claim 1, further comprising:
detecting a scene overlap between said first stereoscopic image and said second stereoscopic image, or component images of said first stereoscopic image and said second stereoscopic image, and
using information of said scene overlap in carrying out said determining that said second central image region comprises said first peripheral scene feature.

5. A method according to claim 1, wherein forming said first stereoscopic image comprises:
combining image content captured by at least two cameras for forming said first left eye image and said first right eye image.

6. A method according to claim 1, wherein forming said first stereoscopic image comprises:
forming at least one of said first left eye image and said right eye image by rendering at least one image region using a depth image.

7. A method according to claim 1, further comprising:
encoding said first stereoscopic image such that said first peripheral image region is at least one of low-pass filtered or encoded with a quantization of lower quality.

8. A method according to claim 1, further comprising:
encoding said first stereoscopic image such that said first peripheral image region is encoded with a different quality for the first left eye image and the first right eye image.

9. A method according to claim 1, further comprising:
determining said first peripheral image region to comprise an image region whose distance from a center of said first stereoscopic image exceeds a threshold in one of horizontal direction, vertical direction or other direction.

10. An apparatus comprising at least one processor, memory including computer program code, the memory and the computer program code configured to, with the at least one processor, cause the apparatus to perform at least the following:
form in a computer memory a first stereoscopic image, said first stereoscopic image comprising a first left eye image and a first right eye image,
determine a first central image region and a first peripheral image region in said first stereoscopic image, said first central image region comprising a first central scene feature and said first peripheral image region comprising a first peripheral scene feature,
form in said computer memory a second stereoscopic image, said second stereoscopic image comprising a second left eye image and a second right eye image,
determine a second central image region and a second peripheral image region in said second stereoscopic image, said second central image region comprising said first peripheral scene feature, and
based on said determination that said second central image region comprises said first peripheral scene feature, encode said first stereoscopic image such that said first peripheral image region be encoded with a reduced quality with respect to said first central image region.

11. An apparatus according to claim 10, wherein said computer program code to cause the apparatus to determine that said second central image region comprises said first peripheral scene feature further comprises computer program code to cause the apparatus to:
use camera setup information of a multi-camera imaging device to carry out said determination, wherein said camera setup information comprises information of overlapping of scene features picked up by cameras of said multi-camera imaging device.

12. An apparatus according to claim 11, wherein said multi-camera device comprises a number of cameras and forming at least two camera pairs for forming said first left eye image, first right eye image, second left eye image, and second right eye image, said at least two camera pairs having different central view directions and said apparatus further comprises computer program code to cause the apparatus to:
use information on said central view directions and switching information between said left eye image, first right eye image, second left eye image, and second right eye image in determining said first central image region, said first peripheral image region and said second central image region.

13. An apparatus according to claim 10, further comprising computer program code to cause the apparatus to:
detect a scene overlap between said first stereoscopic image and said second stereoscopic image, or component images of said first stereoscopic image and said second stereoscopic image, and
use information of said scene overlap in carrying out said determining that said second central image region comprises said first peripheral scene feature.

14. An apparatus according to claim 10, wherein said computer program code for causing the apparatus to form said first stereoscopic image comprises computer program code to cause the apparatus to:
combine image content captured by at least two cameras for forming said first left eye image and first right eye image.

15. An apparatus according to claim 10, wherein said computer program code for causing the apparatus to form said first stereoscopic image comprises computer program code to cause the apparatus to:
form at least one of said first left eye image and said right eye image by rendering at least one image region using a depth image.

16. An apparatus according to claim 10, further comprising computer program code to cause the apparatus to:
encode said first stereoscopic image such that said first peripheral image region is at least one of low-pass filtered or encoded with a quantization of lower quality.

17. An apparatus according to claim 10, further comprising computer program code to cause the apparatus to:
  encode said first stereoscopic image such that said first peripheral image region is encoded with a different quality for the first left eye image and the first right eye image.

18. An apparatus according to claim 10, further comprising computer program code to cause the apparatus to:
  determine said first peripheral image region to comprise an image region whose distance from a center of said first stereoscopic image exceeds a threshold in one of horizontal direction, vertical direction, or other direction.

19. An apparatus according to claim 10, wherein said first central image region and said first peripheral image region comprise whole image coding blocks such that the boundary between said first central image region and said first peripheral image region lies along coding block boundaries.

20. A computer program product embodied on a non-transitory computer readable medium, comprising computer program code configured to, when executed on at least one processor, cause an apparatus or a system to:
  form in a computer memory a first stereoscopic image, said first stereoscopic image comprising a first left eye image and a first right eye image,
  determine a first central image region and a first peripheral image region in said first stereoscopic image, said first central image region comprising a first central scene feature and said first peripheral image region comprising a first peripheral scene feature,
  form in said computer memory a second stereoscopic image, said second stereoscopic image comprising a second left eye image and a second right eye image,
  determine a second central image region and a second peripheral image region in said second stereoscopic image, said second central image region comprising said first peripheral scene feature, and based on said determining that said second central image region comprises said first peripheral scene feature, encode said first stereoscopic image such that said first peripheral image region be encoded with a reduced quality with respect to said first central image region.

* * * * *